United States Patent [19]

Okada et al.

[11] Patent Number: 4,458,276

[45] Date of Patent: Jul. 3, 1984

[54] MAGNETIC TAPE RECORDING/REPRODUCING APPARATUS WITH EJECT SPRING SET BY TAPE DRIVE MOTOR

[75] Inventors: Hitoshi Okada; Kazuki Takai; Katsumi Yamaguchi, all of Saitama, Japan

[73] Assignee: Clarion Co., Ltd., Tokyo, Japan

[21] Appl. No.: 315,962

[22] Filed: Oct. 28, 1981

[51] Int. Cl.³ .................. G11B 15/66; G11B 23/06
[52] U.S. Cl. .............................. 360/96.5; 360/93
[58] Field of Search .......... 360/93, 90, 96.1, 96.3, 360/96.5, 105

[56] References Cited

U.S. PATENT DOCUMENTS

| | | | |
|---|---|---|---|
| 3,882,542 | 5/1975 | Nakamichi | 360/96.5 |
| 4,145,727 | 3/1979 | Tuninetti | 360/96.5 |
| 4,295,169 | 10/1981 | Iwata et al. | 360/93 |
| 4,308,562 | 12/1981 | Negishi | 360/93 |
| 4,320,424 | 3/1982 | Murayama | 360/96.5 |
| 4,337,487 | 6/1982 | Takai | 360/96.5 |
| 4,348,704 | 9/1982 | Takagi et al. | 360/96.5 |

Primary Examiner—Stuart N. Hecker
Attorney, Agent, or Firm—Wallenstein, Wagner, Hattis, Strampel & Aubel

[57] ABSTRACT

A magnetic tape recording/reproducing apparatus having a loading assembly which comprises a rotatable member driven by a motor mounted on the tape deck, a rack member interlocking with a tape pack inserted within said tape deck so as to be slidable with respect to said tape deck so that said rack member is allowed to slide due to rotational force of said rotatable member.

3 Claims, 18 Drawing Figures

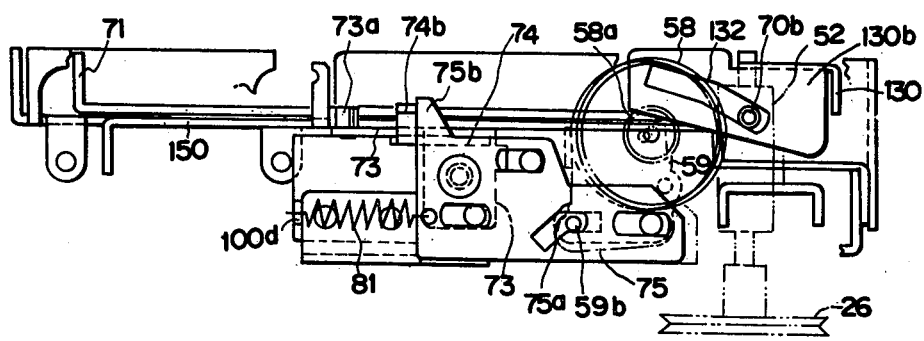
FIG. 9
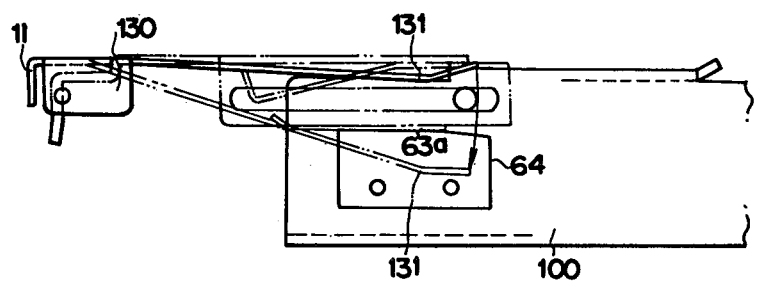
FIG. 10
FIG. 11
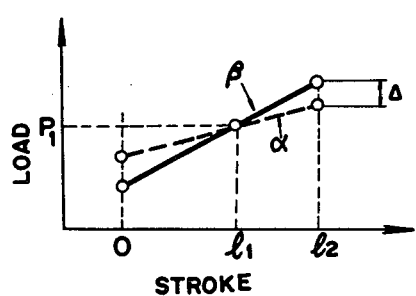
FIG. 12
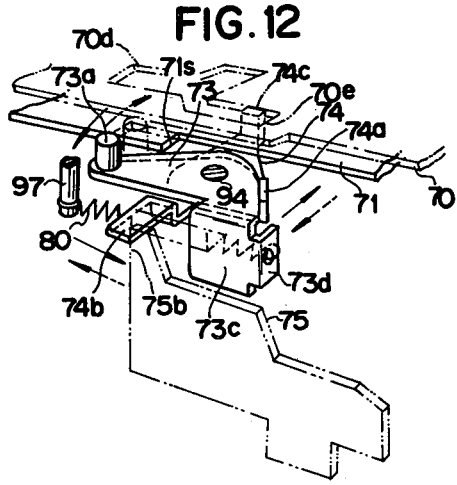

MAGNETIC TAPE RECORDING/REPRODUCING APPARATUS WITH EJECT SPRING SET BY TAPE DRIVE MOTOR

BACKGROUND OF THE INVENTION

1. Field of the Invention

This invention relates to a loading mechanism in a tape player, and more particularly to a mechanism capable of automatically and appropriately carrying out tape pack insertion by utilizing a driving force of a motor.

2. Description of the Prior Art

Generally, as a mechanism for inserting and ejecting a tape pack in a tape player, there has conventionally been proposed such a manner manually inserting a tape pack and operating inner guide mechanisms with that manual force, thus setting a tape at a predetermined position. Particularly in a manner of horizontally inserting a tape pack from a front face of the player, it is necessary, upon insertion, to vertically drop a tape pack and to bring a capstan, a reel, etc. in engagement with the cassette in the predetermined position. Further, upon ejection, it is necessary to vertically raise the cassette pack for being released from the capstan and the reel, thereafter pushing the cassette pack out of an opening of the front face at a certain extent. Those operations of the guide mechanisms for insertion and ejection require a certain operational force.

In recent years, improvements in operability are desired in all the machines and apparatuses and a tape player is not exceptional, either. Then, it has been required to reduce operational force upon insertion and ejection of a cassette type tape pack. In this connection, improvements in a loading mechanism utilizing motor power has become needed because a merely structural improvement cannot achieve a sufficient operability.

Further, in a type of tape players, since there is provided a distance between an insertion opening of a front face and inner mechanisms in order to combine with a radio set or to dispose volume adjuster, etc., the tape pack has to be pushed in from the front face to an extent. However, if the opening is so large just to receive the tape pack only, it is impossible to manually insert the tape pack. Therefore, there has been proposed a mechanism for pulling the tape pack up to the rear end by a spring force. However, in such a mechanism it is necessary to store a pulling force in the spring, thus requiring a relatively large operational force, resulting in inferior operability.

OBJECT OF THE INVENTION

It is therefore an object of the present invention, in order to realize the above requirements and solve the conventional drawbacks, to carry out coupling operation of the tape pack with respect to mechanisms for insertion and ejection in a smooth and precise manner by utilizing motor power.

SUMMARY OF THE INVENTION

In accordance with the present invention, there is provided a magnetic tape recording/reproducing apparatus which comprises:
 a motor provided within said apparatus;
 a rotatable member driven by said motor;
 a rack member interlocking with a tape pack inserted within said apparatus so as to be slidable; and
 an operating means for allowing said rack member to slide with rotational force of said rotatable member.

BRIEF DESCRIPTION OF THE DRAWINGS

FIG. 9 is a side elevation of the gear lock plate, showing the layout of the plate and associated members;

FIG. 10 is a side elevation of the guide plate, showing the operation thereof;

In the above figures, the tape playing state and respective members in position of ejection are appropriately illustrated; in particular, FIGS. 3 and 4, and 7 and 8 show the mechanism in tape playing position with solid lines and that in ejecting position with imaginary lines, while FIGS. 5 and 6, and FIGS. 9 and 10 illustrate the mechanism in position of tape pack ejection with solid lines and the mechanism in tape playing position with imaginary lines (two dot-dash line);

FIG. 11 is an explanatory drawing showing the property of the spring used between the power plate and rack plate;

FIG. 12 is a perspective view showing the relation of the power lock piece with the lock-off plate;

DETAILED DESCRIPTION OF THE PREFERRED EMBODIMENTS

Figure 1:
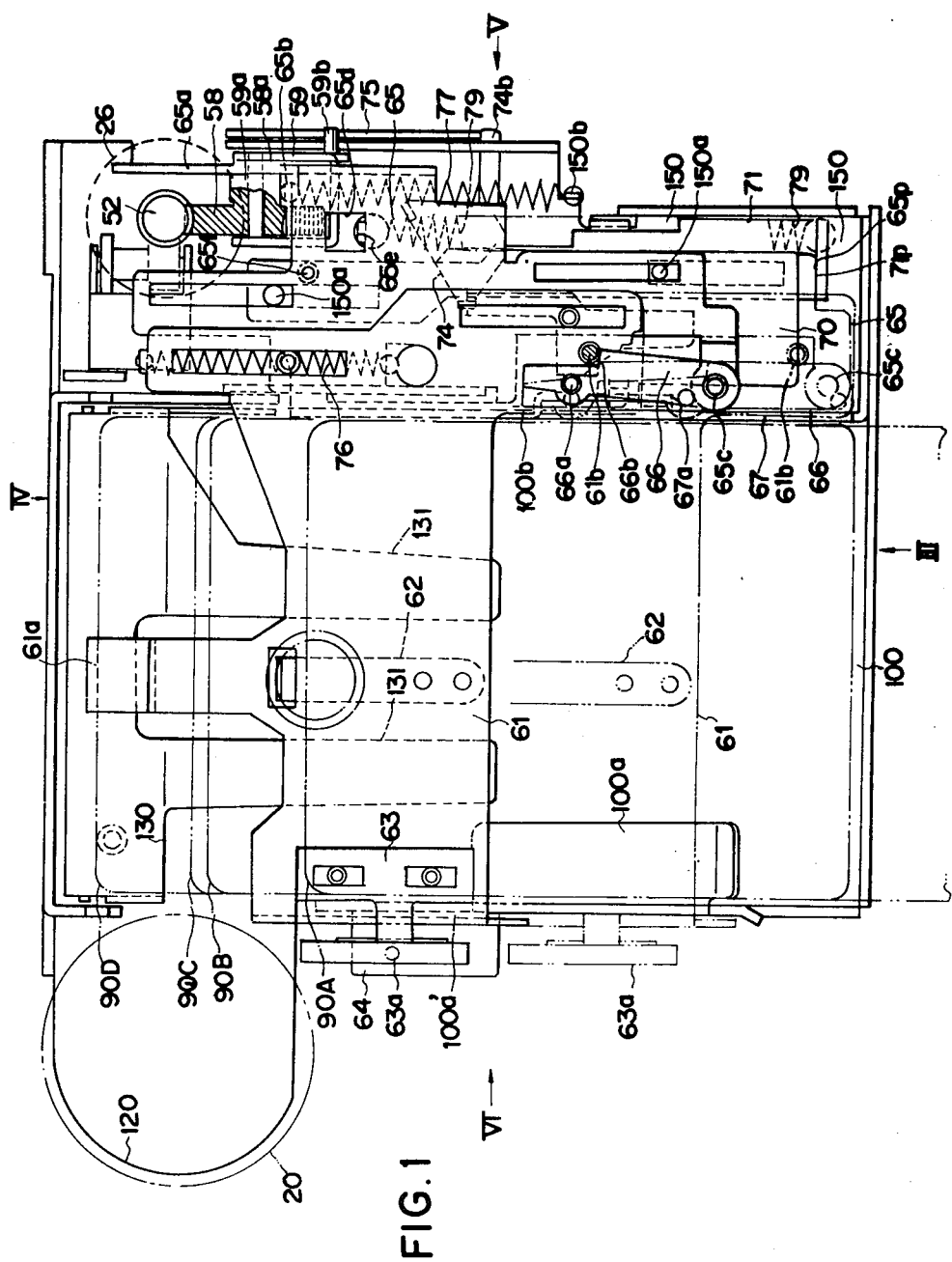
FIG. 1 is a partially cut-off, plan view of a magnetic tape recording/playing apparatus in which the loading mechanism according to the present invention is adopted.
Figure 3:
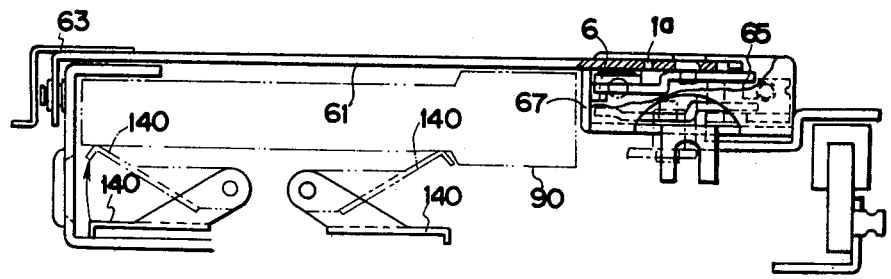
FIG. 3 is a partially cut-off, side elevation of the mechanism viewed from the arrow III in FIG. 1.

Referring now to FIG. 1, a tape deck or magnetic tape recording/playing apparatus is generally shown at the reference numeral 100; within this deck 100 and on the front side of which slidably provided is a sliding frame 61 between a guide 100a' on one side of the deck 100 and a side piece 67 of a support base 150 on the other side of the deck 100. The sliding frame 61 is made to slide by a tape pack being inserted. The sliding frame 61 is formed at the front end thereof with a catch 61a which is bent downward. This catch 61a is to rest on the front end of the tape pack inserted between said guide 100a' and side piece 67, thus the sliding frame 61 being pushed to slide inwardly inside the tape deck 100 against the elasticity of a spring 76 provided between the tape deck 100 and a rack plate 65. On one side of the sliding frame 61 provided is an elastic piece 63 of which a pusher 63a is to act on a start switch 64 installed on the lateral side of the deck 100. When the tape pack 90 is pushed in until the front end thereof reaches the position 90c shown in FIG. 1, the start switch 64 is closed to start a motor 20 fixed to a mount seat 120 in one innermost position of the tape deck 100. A tape pack guide or setting frame 130 is pivotably fixed at the base end thereof to the innermost wall of the tape deck 100 with respect to the sliding frame 61. Further a pair of holding members 140 are opposedly provided within the tape deck 100 as shown in FIG. 3. These holding members 140 are operated symmetrically as interlocked to each other under the action of a spring 142 extending between engagement members 141 shown in FIGS. 4 and 8 and because of the engagement between a bifurcated end 143 of one of the engagement members 141 and an engagement pin 144 on the other engegement member 141. In the normal state, the holding members 141 are kept slanted as shown with imaginary (two dot-dash) line in FIG. 3, 4 or 8. In this condition, the tape pack 90 inserted into the tape deck is accepted and supported at the bottom thereof horizontally at a level nearly same as the tape pack insertion hole in the tape deck as shown with imaginary line (two dot-dash line) in FIGS. 3 and 4. After the tape pack 90 is inserted into the tape deck 100, it is guided by the tape pack guide or setting frame 130 as will be described later as shown with solid line in FIG. 4 and with imaginary line (two dot-dash) in FIG. 8, the holding members 140 are pivoted down so that the tape pack 90 is dropped on the tape deck 100 while being kept horizontal, thus being set at tape recording or playing position within the tape deck 100. To smoothly set the tape pack, the tape pack guide or setting frame 130 has finger-shaped extensions 131 which is somewhat elastic because of their structure. Further, there is provided on the rear face of the sliding frame 61 another elastic support piece 62 of which the top end engages in reel hole in the tape pack 90 which is thus held by the sliding frame 61. In this way, the tape pack is carried along with the sliding frame 61 at time of automatic loading.

Figure 2:
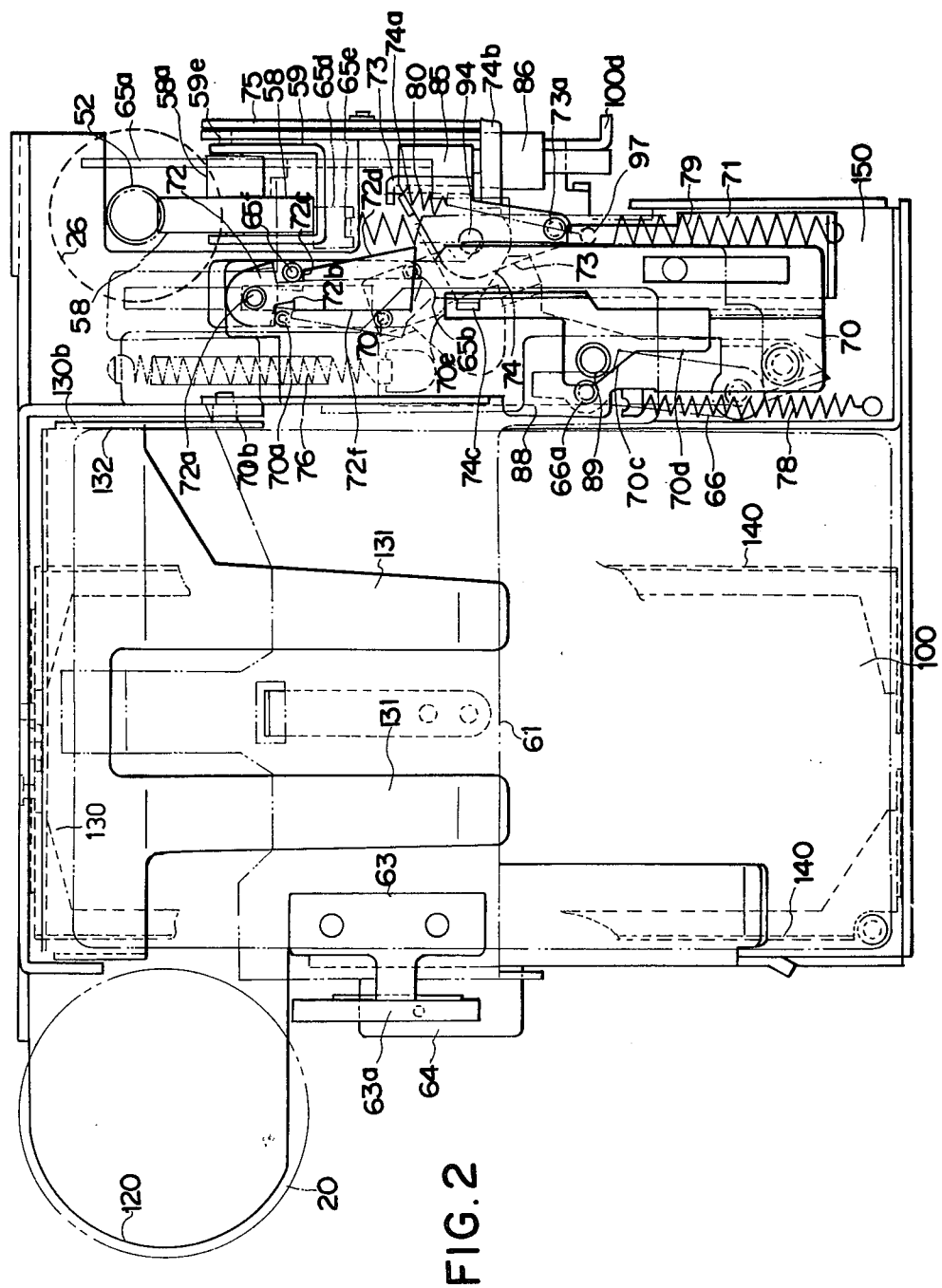
FIG. 2 is a plan view of the mechanism in FIG. 1 with the sliding frame, locking piece and rack plate being removed.
Figure 5:
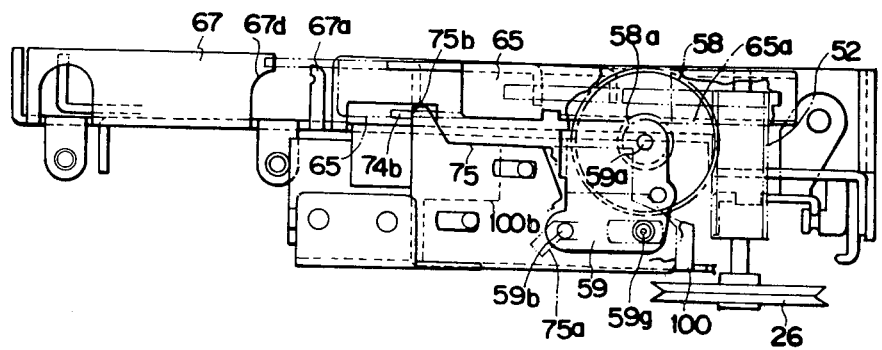
FIG. 5 is a side elevation of the apparatus viewed from the arrow V in FIG. 1.
Figure 6:
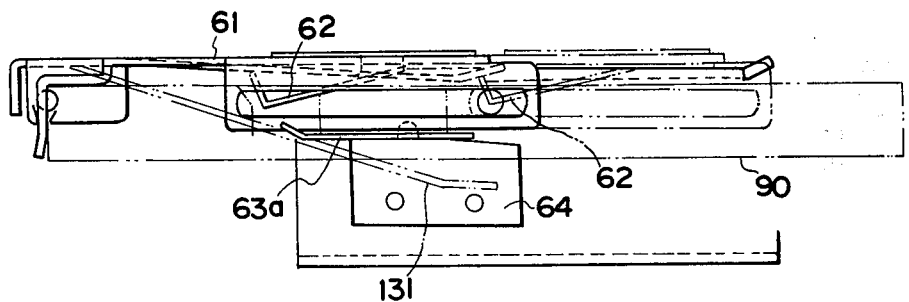
FIG. 6 is a side elevation of the apparatus viewed from the arrow VI in FIG. 1.
Figure 7:
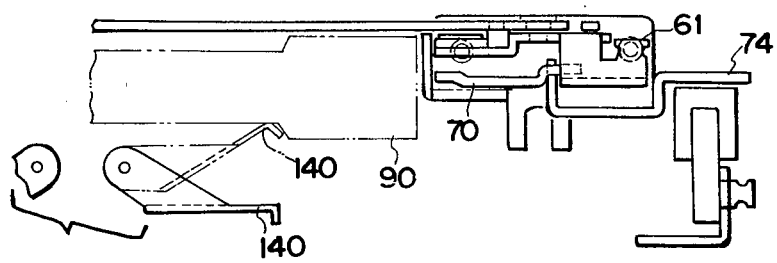
FIG. 7 is a side elevation of the lock-off plate.

Further a rotating member 26 such as pulley which is driven through a belt by means of the previously-mentioned motor 20 is rotatably provided as integrally assembled with a worm 52 in the innermost corner of the tape deck 100 as shown in FIGS. 1 and 2. A gear wheel 58 on which a pinion 58a is integrally formed as shown in FIG. 2 is in mesh with the worm 52. The gear wheel 58 is rotatably mounted on horizontal shaft 59a of a gear support frame 59 as shown in FIG. 1. The pinion 58a engages a lateral rack portion 65a of a rack plate 65 provided so as to be slid by guides 150a on the support base 150, as seen in FIG. 5. Further there is provided a spring 77 between an abutment 65b formed on one end of the rack plate 65 and an abutment 150b of the support base 150. A lock plate 66 is mounted on the front side of the rack plate 65 by a pivot 65c. The lock plate 66 is formed at the top end portion thereof with a pin 66a and a stepped portion 66b. The pin 66a is facing to a side piece 67 formed in a manner folding an edge of the support base 150 and the side piece 67 is formed with a folded step 67a at a central portion thereof for acting on the pin 66a on the way of sliding movement of the lock plate 66. The stepped portion 66b is facing to a pin 61b downwardly protruded on the lower surface of the sliding frame 61.

The above-mentioned lock plate 66 prevents deterioration of insertion sensitivity which may be caused by load fluctuation due to the structure of the present invention in which tape pack insertion is carried out in more than one step and serves as a special overpushing mechanism so as not to apply shock to a gear even when a tape pack 90 is impulsively inserted. That is, in case that interlocking relations of respective members interlocking with tape pack insertion are made to be in several steps in the present invention as will be described later, a relatively large load fluctuation occurs at the moment of changing from the first step to the second step, thus causing deterioration of insertion sensitivity. In this connection, if the desired locked condition can be realized by pushing the pin 61b over a stroke from the position illustrated in FIG. 1 by imaginary line to the position illustrated by a solid line, the locked condition is surely obtained even when the sliding frame 61 is overpushed exceeding the stroke. Additionally, the load on the spring 76 secured on the sliding frame 61 merely varies in a continuous manner even upon the above-mentioned overpushing, thus not causing a large deterioration of insertion sensitivity. Further, by making it possible to overpush the sliding frame 61 in excess of the stepped portion 66b of the lock plate 66, even when the tape pack 90 is inserted with a strong impulse against the sliding frame 61, the impulse acts on the sliding frame 61 and is damped by the spring 76, thus preventing influences of the impulse on other members which are to engage and interlock with the lock plate 66. That is, by yielding the shock on refine teeth of the gear and the rack as will be described later, the refine teeth are kept from damage. Thus, by letting the insertion sensitivity be smooth and keeping the engaging teeth away from shock, smooth and secure operation can be performed in a compact tape player having a several-stepped interlocking mechanism.

On the support block 150, and on the lower surface of the rack plate 65, there are mounted a power plate 71, power lock plate 73 and eject plate 70 as shown in FIG. 2. The power plate 71 and the rack plate 65 are arranged to be integrally slidable in such a manner that a protrusion 65e in an opening 65d of the rack plate 65 is connected by a spring 79 to a base end portion of the power plate 71.

The gear support frame 59 is pivotally mounted on the lateral surface of the deck 100 by a pivot 59g as shown in FIG. 5. A pin 59b formed on a lateral surface of the gear support frame 59 is in engagement with a cam hole 75a formed on a gear lock plate 75 as more clearly shown in FIG. 9. The gear lock plate 75 is always pulled toward the left direction in FIG. 9 by a spring 81 provided between a stopper 100d of the deck 100 and itself.

Further, on a central lower surface of the power plate 71 there is pivotally mounted the power lock plate 73 together with a lock-off plate 74 by means of a pivot 94 and secured on the support base 150. Interrelation of the power lock 73 and the lock-off plate 74 is illustrated in detail in FIG. 12. That is, these members 73 and 74 each is pivotally supported at the central portion thereof and one end thereof is extending so as to project out of the lateral surface of the power plate 71 as shown in FIG. 2. At a corner of the power lock plate 73 there is secured a pin 73a so as to face to an angle 71s formed at a lateral edge of the power plate 71. The power lock plate 73 is further formed, at another corner thereof, with a suspension 73c downwardly folded and extending and the suspension 73c is formed with an engagement edge 73d formed by inwardly bending a lateral end of the suspension 73c. Between the engagement edge 73 and a pin 97 provided on the support base 150 there is provided a tension spring 80.

The lock-off plate 74 is laid under the power lock plate 73 and the top end of the lock-off plate 74 is formed with a protrusion 74c upwardly extending for engaging with an extending portion of a cam hole 70d of an eject plate 70 to receive its movement as shown in FIG. 2. The lock-off plate 74 is further formed with an operational projection 74b by extending and holding the rear end thereof in a step-like configuration so that the top end of the operational projection 74b faces to a projection 75b of the gear lock plate 75. The lock-off plate 74 is further formed with an engagement edge 74a by bending the side edge thereof so as to be operated by the power lock plate 73.

The suspension 73c of the power lock plate 73 is provided with a core 85 facing to an attracting plunger 86. Thus, since the power lock plate 73 is pulled by the spring 80 in the clockwise direction, the core 85 is attracted by the plunger 86 when the solenoid 86 is energized to lock the power lock plate 73. When the solenoid 86 is deenergized, the locked condition is released, and accordingly, since the power lock plate 73 is applied the anticlockwise moment by the power plate 71, it pushes the gear lock plate 75 through the lock-off plate 74 to release the engagement of the gears 52 and 58 until completion of ejecting operation.

Between the eject plate 70 and the support base 150 there is provided a spring 78 as shown in FIG. 2. A projection 70b fromed on the read end of the eject plate 70 is in engagement with an engagement hole 132 formed on a folded portion 130b at the rear end of the tape pack guide or setting frame 130 as shown in FIG. 9 to raise or lay the setting frame 130 in response to the sliding operation of the eject plate 70. The eject plate 70 is formed with the cam hole 70d at a central portion thereof in which a roller 89 secured on a head shift member 88 as shown in FIG. 2 is inserted. Thus, in response to the sliding operation of the eject plate 70, the roller 89 moves along the cam 70c of the cam hole 70d to shift the head shift member 88 in right and left directions in FIG. 2.

Figure 14:
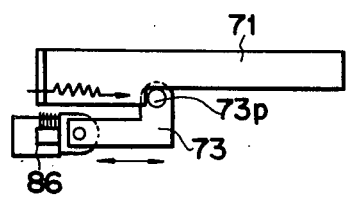
FIGS. 14 and 15 are side elevations illustrating modifications of the power lock plate.

In the above-mentioned structure, structural relation of the power lock plate 73 with respect to the power plate 71 which is an operational member can be modified as shown in FIG. 14. That is, in FIG. 14, the lock plate 73 slidable in parallel with the movement direction of the power plate 71 is to be attracted and secured by the electromagnetic solenoid 86 while the lock of the power plate 71 is released by deenergizing the the plunger 86.

Figure 15:
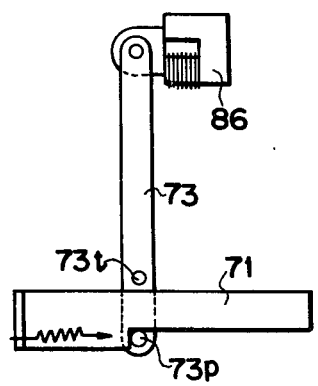

Further, FIG. 15 shows a further embodiment improved in view of the fact that in the embodiment illustrated in FIG. 14, the solenoid 86 is required to have a relatively large attracting force. That is, the lock plate 73 is formed relatively long and large and disposed in a manner rectangularly intersecting with the sliding direction of the power plate 71. The lock plate 73 is then pivotally mounted on the board by a pin 73t near a pin 73p. Thus, by keeping a relatively large arm length from the pin 73t to the solenoid 86, attracting force of the solenoid 86 may be reduced.

Figure 13:
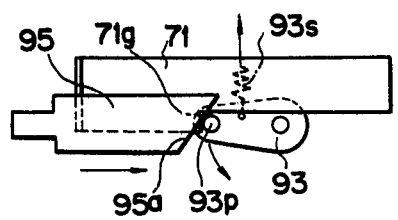
FIG. 13 is a side elevation illustrating a modification of the power plate and the lock means.

With respect to the power lock plate 73, a mechanical structure may be adopted instead of the electric solenoid 86. An example of such mechanical structures is illustrated in FIG. 13 in which the power plate 71 is formed with a step 71g. Adjacent to the step 71g there is provided an engagement member 93 which is pivotally supported with an end thereof, formed with a pin 93p at the other end thereof and provided with a spring 93s at a central portion thereof. Then, when the power plate 71 is pushed into a predetermined position, the pin 93p is stopped by the step 71g to cause the power plate 71 to be locked. At the same time, there is provided a release member 95 formed with a sloping edge 95a at the top end portion adjacent to the pin 93p of the engagement member 93 so that the above locked condition is released by pushing the release member 95 to shift the pin 93p along the sloping edge 95a.

Figure 16:
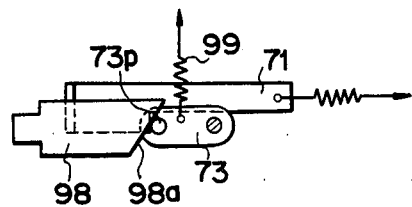
FIG. 16 shows the manually releasing mechanism.

FIG. 16 shows another example of such mechanical locking and unlocking structures in which there is provided the lock plate 73 having a spring 99 with respect to the power plate 71. The lock plate 73 is formed with the pin 73p normally pulled toward locking direction to be locked with respect to the power plate 71 by means of a spring 99 and facing to a sloping edge 98a of a release plate 98 for being released from engagement with the power lock plate 71 when the release plate 98 is pushed.

The above-mentioned spring 79 serves to store ejecting force for the ejecting operation according to the present invention. As to the spring 79, in accordance with the present invention, there is proposed an embodiment as a result of a specific consideration. That is, since the spring 79 which effects ejecting operation of an inserted tape pack together with other members interlocking with the tape pack is required to have a relatively strong elasticity, it is formed as long as possible by securing its both ends on the front end of the power plate 71 and the protrusion 65e near the top end portion of the rack plate 65, respectively. As shown in FIG. 11, the comparison in work load P1 for stroke 11 between a long spring $\alpha$ and short one $\beta$ proves that in case an operating stroke 12 to these springs $\alpha$ and $\beta$ is taken, the short spring $\beta$ needs a force larger by $\Delta$ than that required by the long spring $\alpha$. In the illustrated embodiment in which the tape drive motor 20 is also used to force the spring in this connection, it is appropriately avoided that the motor output becomes insufficient because of the elasticity of the spring 79 and is stopped.

Figure 17:
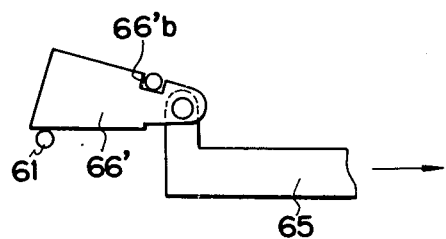
FIGS. 17 and 18 show modifications of the lock plate between the rack plate and the sliding frame.
Figure 18:
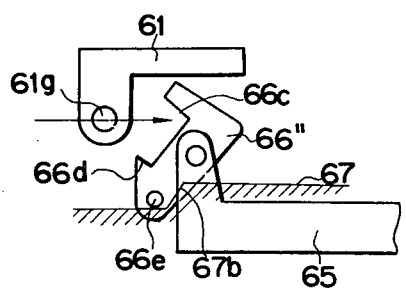

Further, in the above-mentioned embodiment, the lock plate 66 pivotally mounted on the front end portion of the rack plate 65 may be replaced with a lock member 66' which is similar in shape to a pivot lock piece 72 and formed with engagement edges 66i and 66j appropriately sloping at both sides of the lock member 66' as shown in FIG. 17. That is, a pin secured on the support base 150 is engageable with a depression 66'b formed at the engagement edge 66i of the lock member 66', and on the other hand, the above-mentioned pin 61b of the sliding frame 61 is engageable with the other engagement edge 66j of the lock member 66'. Thus, locking operation can be also perfectly effected and even if there occurs some deterioration of insertion sensitivity, the object of the present invention can be attained.

Additionally, the above structure may be replaced with a lock member 66" pivotally mounted on the rack plate 65 with the central portion thereof and formed with steps 66c and 66d at both sides thereof so that a pin 61g of the sliding frame 61 is engageable with the step 66c while a pin 66e formed near the other step 66d is engageable with a slope 67b of the side piece 67, and thus, the sliding frame 61 is locked while sliding and upon completion of sliding movement it is released from locked condition by means of the slope 67b. Also with this arrangement, operation at a preferable timing can apparently be achieved.

Figure 4:
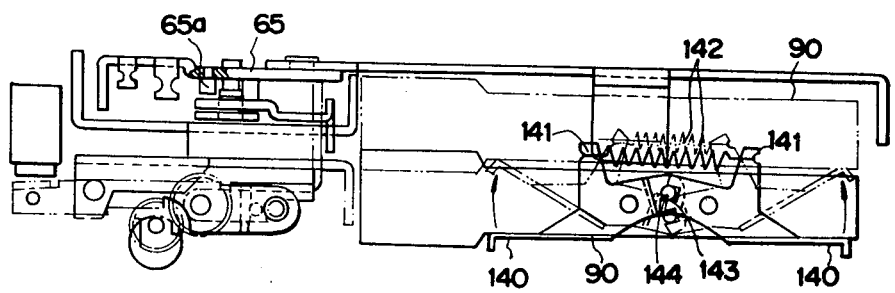
FIG. 4 is a side elevation of the apparatus viewed from the arrow IV in FIG. 1.
Figure 8:
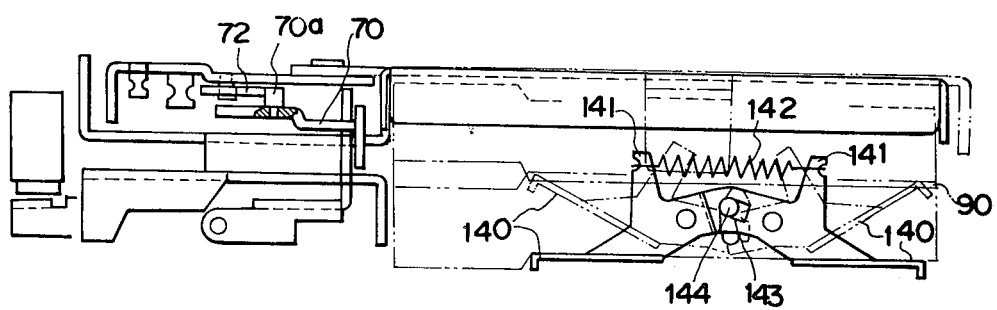
FIG. 8 is a side elevation of the eject plate and pivot lock piece.

The mechanism according to the present invention has been described for its construction in the foregoing. This mechanism functions as described below:

In the illustrated embodiments of the present invention, the ejection condition is such that the members are positioned in relation to each other as indicated with imaginary lines (two dot-dash line) in FIG. 1 and FIGS. 3 thru 10; namely, in the ejection state, the power plate 71 and rack plate 65 are forced in contact with each other at their base ends 71p and 65p by the spring 79 as shown in FIG. 1, while the rack plate 65 is forced by the spring 77. The sliding frame 61 on the rack plate 65 is drawn out by the spring 76 to the position indicated with the imaginary line in FIG. 1. The eject plate 70 has its abutment 70a engaged with the left-hand engagement portion 72b (in the Figure) of the pivot lock piece 72 as the pivot lock piece 72 subject to the action of the pin 65f of the rack plate 65 when the rack plate sides is pivoted about the pivot 72a as indicated with imaginary line in FIG. 2. Thus, the cam portion 70c of the cam hole 70d in the eject plate 70 acts on a pivot 89 to retreat a head shift member 88 from the insertion area of the tape pack (or tape cassette) 90, thereby providing a state in which the tape pack may be moved upward and downward. Further, the worm 52 and worm wheel 58 shown in FIGS. 1, 5 or 9 are generally in mesh at their tooth tops with each other; in this condition, the pin 59b of the gear support frame 59 on which the worm wheel 58 is fixed is positioned in the slanted portion of the engagement hole 75a in the gear lock plate 75 as shown in FIG. 9. In this state, as shown in FIGS. 3, 4 and 8 by imaginary lines, the holding members 140 and 140 are kept raised due to the force of the spring 142 and the tape pack 90 is accordingly held at a height capable of effecting inserting and ejecting operations.

The loading operation following to that state will now be described. The loading operation is carried out as follows in response to pushing-in of the tape pack 90 i.e. advanced positions of the front end of the tape pack 90 as illustrated by reference numerals 90A–90D in FIG. 1.

While the inserted tape pack 90 is forwardly pushed, the front end of the tape pack contacts with the catch 61a of the sliding frame 61 to allow it to integrally slide. Consequently, when the front end of the tape pack 90 reaches the position 90B, the pin 61b downwardly projecting from the right portion in the drawings of the sliding frame 61 extending over the support base 150 advances to reach the stepped portion 66b of the lock plate 66 which is in the retired position illustrated with imaginary line in FIG. 1 to allow the lock plate 66 to rotate at the pivot 65c in the clockwise direction in the drawings. Accordingly, the pin 66a formed at the pivotal end of the lock plate 66 and the folded step 67a of the side piece 67 beside the support base 150 are disengaged from each other so that the rack plate 65 which has been held in the retired position as illustrated with imaginary line in FIG. 1 becomes possible to advance through the lock plate 66. That is, when the front end of the tape pack 90 is at the position 90B, the rack plate 65 is made to be integral with the sliding frme 61 due to the force of the spring 76 tensed therebetween. On the other hand, when the front end of the tape pack 90 reaches 90C as will be described later, the sliding frame 61 causes, on the way of its forward movement, the elastic piece 63 provided along the other side of the sliding frame 61 to turn the start switch 64 on thus to rotate the motor 20 and energize the electromagnetic solenoid 86, thus automatically inserting the tape pack 90 with the driving force of the motor 20.

The technical reason why the sliding frame 61 and the rack plate 65 are separately formed so as to engage with or disengage from each other on the way of insertion of the tape pack 90 by means of the lock plate 66, etc. in the present invention lies in minimizing depth of such a tape player, commonly using the motor 20 for driving tape also in auto-loading and preventing teeth of gears and racks for effecting the auto-loading from being broken. That is, in a tape player in which gears and racks are always engaging with each other, if an independent motor is used for performing auto-loading other than a motor for driving tape, two motors will be required. Accordingly, the mechanism including circuits for those motors will be made complicated and large in size to largely reduce the substantial merit which should be realized in such an auto-loading mechanism. Therefore, it is very significant to make a motor for driving tape also perform auto-loading. In this connection, when a motor is used for such two different operations, it is preferable to separate operations of the rack as well as gear and the sliding frame in the middle of the insertion stroke (to change interlocking relation of them), because, due to pack pushing-out operation upon ejection, etc, there are required different requirements between the operation of the sliding frame which engages with the front end of the tape pack to integrally slide therewith and the operation of the rack as well as the gear for performing auto-loading, respectively. Such structure also serves to reduce the depth of the player. However, if the rack and the gear are completely separated from each other to effect the above separation, they cannot smoothly engage with each other and there is a large possibility of breaking their teeth. Therefore, it is required to separate the rack as well as gear, as being kept engaged with each other, from the sliding plate. To this end, the above-mentioned manner for changing their interlocking relations is adopted by utilizing the lock plate 66. Thus, by limiting the stroke in which the rack and gear are in engagement with the sliding plate 61 in a predetermined distance, it is possible not only to secure a durable and smooth auto-loading operation but also to reduce the depth of the tape player.

Since the gear wheel 58 is not in complete engagement with the worm 52 during the stroke of the tape pack from the position 90B to 90C, in order to allow the former to appropriately engage with the latter, there is provided an excess stroke until the power plate 71 integrally shifting with the rack plate 65 in the stroke from 90B to 90C comes to be locked by the power lock plate 73. That is, since load becomes very large in a power loading mechanism, it is necessary to allow the worm 52 and the gear wheel 58 to engage with each other before the load gets large. If the worm 52 begins its rotation before its engagement with the gear wheel 58 to actuate the ejection spring 79 fixed on the rack plate 65, the gear wheel 58 and the worm 52 are not engageable with each other due to a relatively large repulsive force (about 3 kg, for example) caused by rotational movements of the gear wheel 58 and the worm 52. In this connection, there is provided the above-mentioned excess stroke so as to enable the engagement of the gear wheel 58 and the rack 52 as well as the lock of the wheel case 59 with respect to the wheel lock plate 75.

Until the power plate 71 is locked by the power lock plate 73, the rack plate 65 and the power plate 71 are pulled toward each other by the spring 79 to press the front end of the rack plate 65 and the folded end of the power plate 71 thus to allow them to integrally slide. On the other hand, the pin 66a of the lock plate 66 is released from engagement with the base end of the folded step 67a of the slide piece 67 and gets to contact with the lateral surface of the folded portion 67a in a accordance with forward movement of the rack plate 65 thus to limit rotation of the lock plate 66 in the anti-clockwise direction. Since the lock plate 66 is kept in the position illustrated with solid line in FIG. 1 unless the rack plate 65 returns, the sliding frame 61 remains in integral relation with the rack plate 65. Incidentally, the lock plate 66 is provided with the overpushing assembly as described before and the teeth of the gear as well as the rack are prevented from breakage. Thus, in the stroke of the tape pack 90 from the position 90B to 90C, the start switch 64 is turned on to actuate the motor 20 thus to drive the worm 52, and accordingly, when the front end of the tape pack reaches the position 90C, the angle 71s of the power plate 71 comes to contact with the pin 73a. At that time, the core 85 provided in the suspension 73c of the power lock plate 73 is attracted by the electromagnetic solenoid 86 then energized, thus the rotation thereof to the anti-clockwise direction in FIGS. 2 and 12 being regulated, and accordingly the power plate 71 cannot further advance.

The tape pack insertion in the stroke from 90C to 90D is performed by the motor 20 which makes the rack plate 65 slide through the worm 52. That is, the tape pack 90 is made integral with the sliding frame 61 by the elastic support piece 62 to advance together and while storing ejecting elasticity in the spring 79, reaches at the utmost end position 90D. While the rack plate 65 is carrying the tape pack upto the position 90D, the rack plate 65, with the pin 65f thereof, rotates the pivot lock piece 72 a little to the left as illustrated with imaginary line in FIG. 2. Although the pin 70a of the eject plate 70 is in engagement with the depression 72b of the pivot lock piece 72 thus to lock the eject plate 70 in that position, when the tape pack 90 reaches the position 90D, the pin 65f falls in the other depression 72c to thereby release the above unrotatable condition, whereby the above-mentioned lock of the eject plate 70 is also released. At that time, the eject plate 70 is pulled by the spring 78 to downwardly slide in the drawings and acts on the protrusion 74c of the lock-off plate 74 just before the completion of the sliding movement thus to rotate the lock-off plate 74 to the anti-clockwise direction in the drawings. Accordingly, the operational projection 74b of the lock-off plate 74 pushes the gear lock plate 75 to thereby disengage the gear wheel 58 from the worm 52.

The projection 70b of the eject plate 70 forwardly pushed as above leftwardly and upwardly slides within the engagement slit 132 of the tape pack guide or setting frame 130 in FIG. 9 to slant the setting frame 130 on the tape deck 100, thus setting the tape pack 90 in the reproducing mode.

As to the operation of the power plate 71 and the power lock plate 73 in FIG. 3, since the pin 93p is pulled toward the step 71g by the spring 93s and slidable along the sloping edge 95a of the release member 95 and the release member is mounted slidable in horizontal direction, the pin 93p is released from engagement with the step 71g by pushing the release member 95 by hand or the like.

Further, when using the attracting solenoid 86 with respect to the power lock plate 73 for locking the power plate 71, it is possible not only to effect appropriate locking operation under the energized condition of the solenoid 86 but also to automatically perform ejecting operation when the solenoid is deenergized irrespectively locked condition or operating time, thus preventing respective members from being broken without applying unreasonable shock to the operational mechanism.

In the embodiment illustrated in FIG. 13, such operation can be manually done at a desired timing in accordance with a user's intension.

Ejecting operation in accordance with the above-mentioned embodiment is carried out as follows:

In FIGS. 1-10, playing condition in which the tape pack 90 is set is illustrated with solid lines. Under that condition, the solenoid 86 is deenergized in response to the tape end signals, engine switching operation of the car, ejecting switch operation of the tape player, etc., or otherwise, by inwardly pushing the release plate 98 as shown in FIG. 15, ejecting operation is performed. That is, since the power lock plate 73 which has been attracted by the solenoid 86 during playing time and held at the predetermined locked condition becomes rotatable, the eject plate 70 upwardly shifts in FIG. 2 due to the spring force which has been stored spring 79 during the loading process of the tape pack 90. Due to the displacement of the eject plate 70, the cam 70c in the cam hole 70d acts on the roller 89 to cause the head shift member 88 for shifting the head and the pinch roller to retire from the position illustrated in FIG. 2 and to be released from the engageable position with respect to the tape pack 90 which is in contact with the head and the pinch roller. Further, due to the displacement of the eject plate 70 as mentioned above, the pin 70a thereof falls in the left (in FIG. 2) depressing 72b of the pivot lock piece 72 which is rotated to the clockwise direction by the pin 65f, thus rotating the pivot lock piece 72 from the position illustrated with solid line in FIG. 2 to the position illustrated with imaginary line. Accordingly, the pin 65f of the rack plate 65 disengages from the depression 72c to cause the rack plate 65 and the power plate 71 to be in an integral body because the utmost end 65p of the rack plate 65 is pressed to the holded end 71p of the power plate 71 by the spring 79 as shown in FIG. 1. Thus, the rack plate 65 is drawn out by means of the spring 77 to allow the sliding frame 61 to integrally slide by means of the spring 76 through the lock plate 66 which is positioned as illustrated by solid line in FIG. 1. Thus, the eject plate 70 shifts to the upward direction in FIG. 2 to cause the finger-shaped extensions 131 of the tape pack guide or setting frame 130, which gains rising force in accordance with the relation between the projection 70b and the engagement hole 132, to upwardly rotate and lose the downward pushing force. Consequently, the holding members 140 raise the tape pack 90 due to the spring force of the spring 142 to allow the tape pack 90 to be pulled out in accordance with the sliding movement of the sliding frame 61, thus performing ejecting operation.

As described above, according to the present invention, it is possible to automatically drop a tape pack inserted in the insertion opening into the reproducing position and to allow reel driving shifts to automatically engage with reel holes of the tape pack. Further, loading operation can be performed while automatically storing ejecting force by utilizing a motor. Therefore, the present invention is practically effective in enabling smooth and appropriate operation of the tape player and providing a compact mechanism thereof.

Further, in the embodiments according to the present invention, interlocking relation of respective interlocking members actuated by the insertion of the tape pack is made to be more than one step in such a manner transmitting movement of the sliding frame, which ingegrally shifts with the tape pack, to the rack member through the lock plate 66 and providing an arrangement between the lock plate 66 and the rack member for allowing over-push of the tape pack. Therefore, by absorbing the gap between operations of respective mechanical members which may be caused upon insertion of the tape pack, insertion sensitivity of the tape pack is made smooth and plain. Additionally, even when the tape pack is overpushed by a manual force in excess of required extent, the teeth of the rack member and the gear member engaging therewith are prevented from being broken. Finally, by adopting such interlocking manner of the members in more than one step, the tape player can be compact in size.

We claim:

1. In a magnetic tape cassette recording and reproducing apparatus having a tape driving motor, reel drive bases, and at least one magnetic head movably responsive to movement of a movable head shifting member, the improvement comprising:
    a rotatable member driven by said motor;
    a sliding frame adapted to insertingly accept and slide in response to insertion of a tape cassette thereinto;
    only a single rack member interlocking with said slidable frame so as to be slidable;
    an operating means for causing said rack member to be slidingly driven by rotation of said rotatable member, so as to guide said tape pack to a recording and reproducing position in said apparatus, said operating means including a gear member for engaging said rotatable member to transmit the rotational drive therefrom to said rack member and a release means for releasing the engagement between said gear member and said rotatable member;
    an eject plate interlocking with said sliding frame, said head shifting member engaging with said eject plate to shift said magnetic head;
    an operational member for applying an ejecting force to said eject plate;
    an eject spring coupled between said rack member and said operational member so as to store said ejecting force due to the sliding of said rack member, said operational member being adapted to be slidable with said rack member so as to apply the ejecting force stored in said spring to said eject plate, said stored spring energy supplying the sole motive force to said eject plate;
    lock means for locking said operational member in a given position corresponding to said recording and reproducing position; and
    release means for releasing said operation member from said locked condition produced by said lock means.

2. Apparatus as recited in claim 1 wherein said lock means comprises a lock piece slidable in parallel with the direction of movement of said operational member, and an electromagnetic solenoid for attracting and securing said lock piece so that said locked condition of said operational member is released by deenergizing said solenoid.

3. Apparatus as recited in claim 1 further comprising a start switch for actuating said motor, a loading operational member, and a lock member for causing engagement between said sliding frame and said loading operational member so as to shift them integrally, said switch being turned on and off by said sliding frame, and said loading operational member being driven by said motor so as to set said tape cassette at a recording and reproducing position.

* * * * *